United States Patent
O'Gorman et al.

(10) Patent No.: US 8,466,980 B2
(45) Date of Patent: Jun. 18, 2013

(54) METHOD AND APPARATUS FOR PROVIDING PICTURE PRIVACY IN VIDEO

(75) Inventors: Lawrence O'Gorman, Madison, NJ (US); Christophe Wolff, Benfeld (FR); Patrick Mourot, Illkirch (FR)

(73) Assignee: Alcatel Lucent, Paris (FR)

( * ) Notice: Subject to any disclaimer, the term of this patent is extended or adjusted under 35 U.S.C. 154(b) by 473 days.

(21) Appl. No.: 12/923,017

(22) Filed: Aug. 30, 2010

(65) Prior Publication Data

US 2011/0242345 A1 Oct. 6, 2011

Related U.S. Application Data

(60) Provisional application No. 61/321,232, filed on Apr. 6, 2010.

(51) Int. Cl.
*H04N 5/228* (2006.01)

(52) U.S. Cl.
USPC ...................................................... 348/222.1

(58) Field of Classification Search
USPC ............. 348/222.1, 571, 578, 586, 143, 14.1, 348/239; 382/276, 260
See application file for complete search history.

(56) References Cited

U.S. PATENT DOCUMENTS

| | | | | |
|---|---|---|---|---|
| 6,366,316 | B1 * | 4/2002 | Parulski et al. | 348/239 |
| 2008/0212888 | A1 * | 9/2008 | Rai | 382/260 |
| 2009/0219379 | A1 * | 9/2009 | Rossato et al. | 348/14.01 |
| 2011/0158470 | A1 * | 6/2011 | Martin et al. | 382/100 |
| 2012/0033072 | A1 * | 2/2012 | Lin | 348/143 |
| 2012/0162416 | A1 * | 6/2012 | Su et al. | 348/143 |

* cited by examiner

*Primary Examiner* — Aung S Moe
(74) *Attorney, Agent, or Firm* — Harness, Dickey & Pierce

(57) ABSTRACT

The present invention relates to a method and apparatus for providing picture privacy in video. The method includes separating, by the processor, pixels of a first type from pixels of a second type in a current gray-scale frame based on a decision threshold, where each of the pixels of the first and second types includes an image pixel value, and applying, by the processor, a privacy filter to the pixels of the first type. The privacy filter is configured to randomly swap the image pixel values within a pixel area to occur at different locations in the pixel area. The method further includes combining, by the processor, the filter pixels of the first type with the pixels of the second type.

18 Claims, 5 Drawing Sheets

Difference Image

METHOD AND APPARATUS FOR PROVIDING PICTURE PRIVACY IN VIDEO

PRIORITY INFORMATION

This application claims priority to Provisional Application No. 61/321,232 filed Apr. 6, 2010; the entire contents are hereby incorporated by reference in their entirety.

BACKGROUND

Background privacy filters suppress the background in video applications such as video teleconferences, for example. For instance, a user wants to be seen on a video conference call, but may not want background information such as personal or proprietary items to be seen by the other users. Similarly, foreground privacy filters suppress the foreground in video applications such as video monitoring, for example. For instance, some countries have legal restrictions on video monitoring, or some people have issues of privacy in a public or private space. In this case, the people being subjected to the video monitoring would want to have their image suppressed. Therefore, a foreground privacy filter would suppress the person's image while allowing the background to be viewed.

Conventional methods for background/foreground suppression sometimes produce errors where foreground is erroneously detected as background and vice versa. Conventional methods employed to date typically have error correction methods, but errors can rarely be reduced to zero. Therefore, the result of background/foreground suppression is often not good enough because an image with foreground/background holes in the video is considered low quality and reflects poorly on the product. One particular example uses a blurring filter in which background-detected pixels are replaced by a low-pass filtered (blurred) result of pixels at the same location from the current video frame. However, even though this may be an effective approach at background removal, it results in the video looking "cheap" (i.e., we are used to blurred images being poor quality). This also requires a large blurring filter to sufficiently obscure the background, and large blurring filters are computationally expensive.

In addition, conventional methods for separating the background pixels from the foreground pixels suffer from technical problems. For instance, after a difference between a current frame and calculated background frame is obtained, the difference image is subjected to a thresholding operation. The conventional art uses a manual static threshold determination that does not adapt for lighting changes and background updates. More sophisticated methods of automatically thresholding the difference image employ traditional statistical methods such as minimization of in-class error to determine the background and foreground pixel classes. However, these traditional statistical methods are not optimized to images and often leave holes in what should correctly be uniform foreground or background regions. As a result, the background and foreground pixels may contain a significant amount of errors. Thus, a more effective approach is desired.

SUMMARY

The present invention relates to a method and apparatus for providing picture privacy in video.

The method includes separating, by the processor, pixels of a first type from pixels of a second type in a current gray-scale frame based on a decision threshold, where each of the pixels of the first and second types includes an image pixel value, and applying, by the processor, a privacy filter to the pixels of the first type. The privacy filter is configured to randomly swap the image pixel values within a pixel area to occur at different locations in the pixel area. The method further includes combining, by the processor, the filter pixels of the first type with the pixels of the second type.

In one embodiment, the first type is background pixels and the second type is foreground pixels. In an alternative embodiment, the first type is foreground pixels and the second type is background pixels.

The separating step may further include determining a difference image based on a difference between the current gray-scale frame and an initial image, calculating image connectivity for the difference image, and obtaining the decision threshold based on the calculated image connectivity. The separating step may further include determining a number of threshold levels for the difference image, where the obtaining step obtains the decision threshold based on a local maximum of an average run-length over the number of threshold levels. The separating step further includes determining the initial image based on at least one lateral movement of a user.

According to embodiments of the present invention, pixels having image pixel values below the decision threshold are pixels of the first type and pixels having pixel values above the decision threshold are pixels of the second type. The method may further include determining whether to apply the privacy filter.

According to embodiments of the present invention, an average intensity and color of an image that includes the combined pixels is same as an original image of the combined pixels.

The system includes a video camera configured to capture video data and a processor configured to separate pixels of a first type from pixels of a second type in a current gray-scale frame of the video data based on a decision threshold, where each of the pixels of the first and second types includes an image pixel value. Further, the processor is configured to apply a privacy filter to the pixels of the first type, where the privacy filter is configured to randomly swap the image pixel values within a pixel area to occur at different locations in the pixel area. Still further, the processor is configured to combine the filter pixels of the first type with the pixels of the second type to create a resulting video image. The system also includes a video display configured to display the resulting video image.

According to one embodiment, the first type is background pixels and the second type is foreground pixels. According to an alternative embodiment, the first type is foreground pixels and the second type is background pixels.

Also, the processor is configured to determine a difference image based on a difference between the current gray-scale frame and an initial image, to calculate image connectivity for the difference image, and to obtain the decision threshold based on the calculated image connectivity. The processor is configured to determine a number of threshold levels for the difference image, where the processor obtains the decision threshold based on a local maximum of an average run-length over the number of threshold levels. The processor is configured to determine the initial image based on at least one lateral movement of a user.

According to embodiments of the present invention, pixels having image pixel values below the decision threshold are pixels of the first type and pixels having pixel values above the decision threshold are pixels of the second type. The processor is configured to determine whether to apply the privacy filter.

According to embodiments of the present invention, an average intensity and color of an image that includes the combined pixels is same as an original image of the combined pixels.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein.

DETAILED DESCRIPTION OF EXAMPLE EMBODIMENTS

Figure 1:
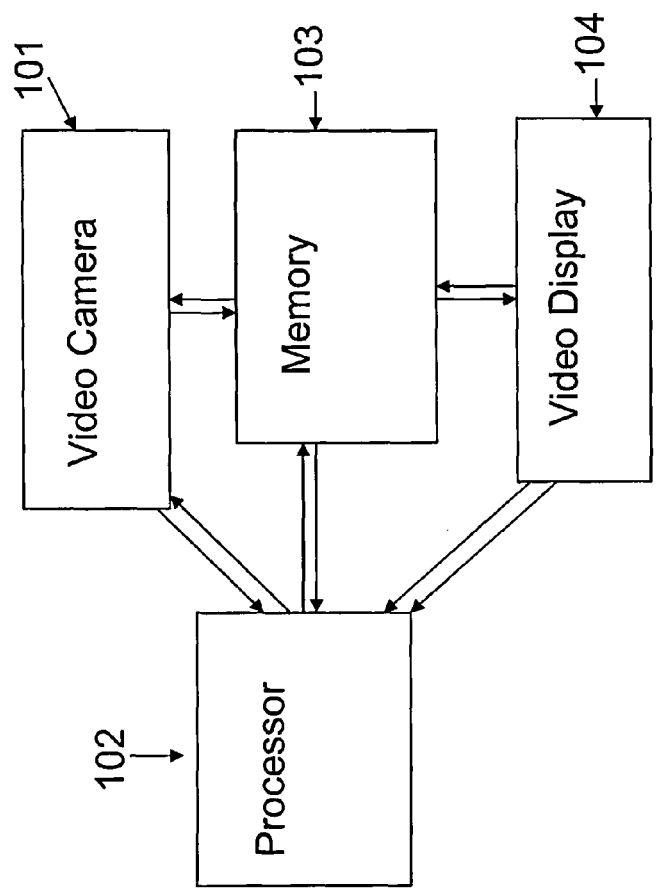
FIG. 1 illustrates an apparatus for providing picture privacy in video according to an embodiment of the present invention.

Various embodiments of the present invention will now be described more fully with reference to the accompanying drawings. Like elements on the drawings are labeled by like reference numerals.

As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The present invention will now be described with reference to the attached figures. Various structures, systems and devices are schematically depicted in the drawings for purposes of explanation only and so as not to obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. To the extent that a term or phrase is intended to have a special meaning, i.e., a meaning other than that understood by skilled artisans, such a special definition will be expressly set forth in the specification that directly and unequivocally provides the special definition for the term or phrase.

The embodiments described below illustrate a foreground/background suppression technique that includes a separation technique (e.g., separating background pixels from foreground pixels) and a "frosted window" filter that is applied to the separated background or foreground pixels. The separation technique is based on spatial connectivity of the pixels as opposed to treating each pixel with spatial independence. The video foreground/background privacy filter de-emphasizes error by maintaining intensity, color, and frequency characteristics. The background/foreground suppression technique may be implemented in any type of video camera system including mobile communication devices and video monitoring systems, for example.

FIG. 1 illustrates an apparatus for providing picture privacy in video according to an embodiment of the present invention. For example, the apparatus may include a video camera 101, at least one processor 102, memory 103, and a video display 104. The video camera 101 may be any type of component capable of capturing video data during a video conferencing session or video monitoring application, for example. The memory 103 may be any type of memory capable of storing at least a portion of the video data received by the video camera 101. The video display 104 may be any type of output component that is capable of displaying video data such as a liquid crystal display (LCD), for example. The processor 102 is configured to control at least the video camera 101, the memory 103, and the video display 104. These components may be embodied in one device, or two or more devices according to any type of combination. Also, the apparatus of FIG. 1 may include other components that are well known in video camera systems.

Figure 2:
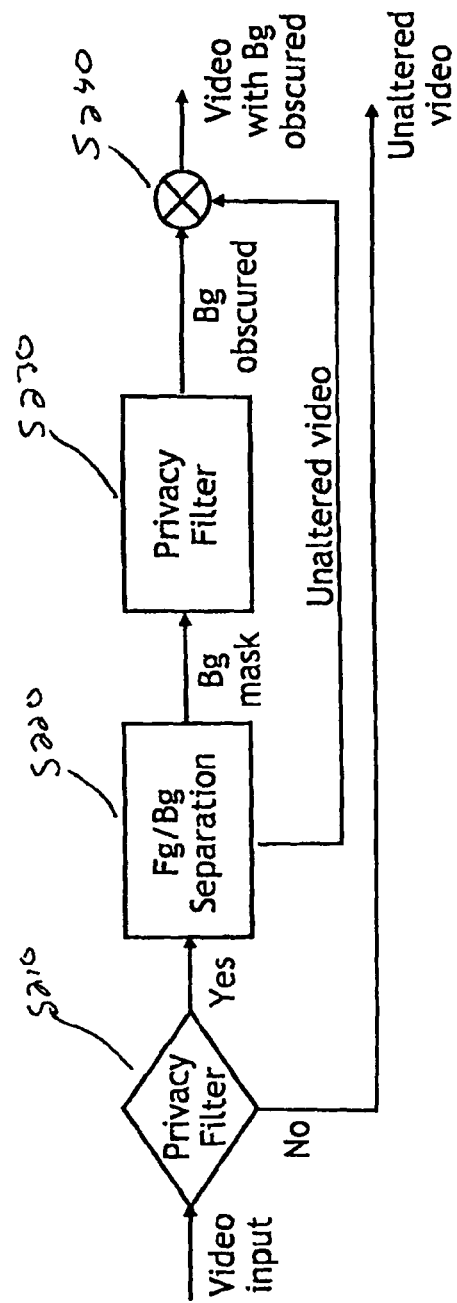
FIG. 2 illustrates a method for providing picture privacy in video in which foreground is designated "Fg" and background is designated "Bg", according to an embodiment of the present invention.

FIG. 2 illustrates a method for providing picture privacy in video according to an embodiment of the present invention. After the video data is captured by the video camera 101, in step S210, the processor 102 determines whether to apply a privacy filter to the captured video data. For example, when the privacy filter is applied, the processor 102 suppresses either the background or the foreground. For instance, when the privacy filter is implemented in a mobile communication device, the camera phone may provide three options: full image, background suppressed, or foreground suppressed. If the "full image" option is selected, the privacy filter is not applied to the video data. Rather, the video data is left unaltered and allowed to be displayed without the background or foreground being suppressed. Also, the foreground suppression option may be implemented in a video monitoring device. For example, the processor 102 may apply the foreground privacy filter based on the density of people in an area, the number of pedestrians walking past the camera, the number of people before an interactive advertising sign, or the existence of a public telepresence station, for example. However, if the "background suppression" option or the "foreground suppression" option is determined to be applied, the method continues to step S220.

In step S220, the processor 102 separates the background pixels from the foreground pixels based on a decision threshold. The decision threshold is the threshold that separates one type of pixels from another type of pixels. In one embodiment, the decision threshold may be an optimal threshold. For instance, the threshold that separates the background pixels from the foreground pixels is optimized by using a connectivity criterion function, as explained with reference to FIG. 3. However, it is noted that although the description of the embodiments describe the video data as two levels (background and foreground), the video data may contain any number of levels.

Figure 3:
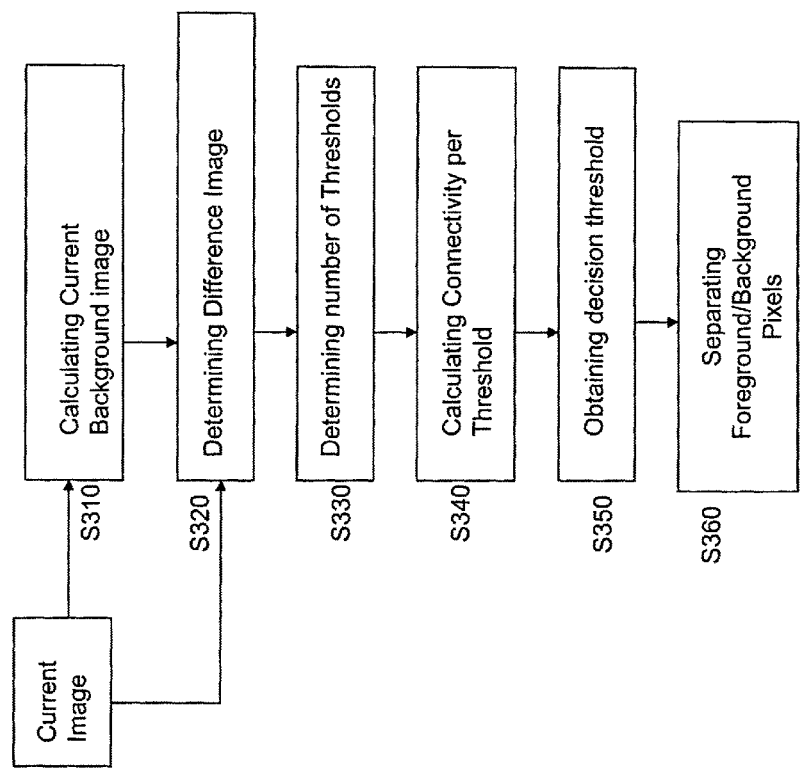
FIG. 3 illustrates a method for separating pixels of a first type from pixels of a second type according to an embodiment of the present invention.

FIG. 3 illustrates a method for separating the background pixels from the foreground pixels (or vice versa). In S310, the processor 102 calculates an initial image (background or foreground) based on previous gray-scale frames stored in the memory 103, as explained below. For example, if background suppression is used, the initial image is an initial background image. If foreground suppression is used, the initial image is an initial foreground image. For instance, in regards to video monitoring, the initial foreground image may be determined based on previous gray-scale frames stored in the memory 103. In regards to video conferencing, the initial background image may be determined as further explained below.

For example, the processor 102 registers the initial image in a manner that allows the user to stay in the image while the background is registering. For instance, the user first signals that in the next few seconds or so, the user wishes to initiate the background image while the user remains in the image. The background initialization process begins and the user is instructed to move in a rightward and leftward direction. For instance, the processor 102 may instruct the user to lean an inch or so to the left and an inch or so to the right. However, any lateral movement will suffice. Then, the processor 102 determines the left and right boundaries of the user, and joins the left and right boundaries to obtain a silhouette of the user. The processor 102 uses this silhouette to modify the initial background image by removing the user's image (e.g., the foreground) from this background image, and setting those pixels to a value that signifies unknown background pixel values. The resultant "hole" of unknown background pixel values is subsequently updated through the regular background updating process as more frames are captured, and if/when the user moves away from that area to reveal the true background. The rest of the specification explains the privacy filter in terms of background suppression. This is done for explanatory purposes only. However, it is recognized that the background privacy filter explained below would equally apply to the foreground privacy filter.

Once this initial background image is determined, in S320, the processor 102 determines a difference image according to a difference between the initial background image and the current gray-scale frame. In S330, the processor 102 applies a thresholding operation to the difference image in order to obtain a number of thresholds. Thresholding is an image processing operation applied to the difference image (gray-scale video data) to obtain binary intensity level images or multiple intensity level images. A gray-scale difference image typically has a large range of intensity values, e.g., 256 values, but usually less levels of information. Proper thresholding requires both proper selection of the number of thresholds needed to represent the number of levels of information and also the selection of the optimum values for these thresholds. Embodiments of the present invention employ the thresholding operation as explained with reference to U.S. Pat. No. 5,781,658, which is incorporated by reference in its entirety.

After the number of threshold levels is determined, in S340, the processor calculates image connectivity in order to obtain the decision threshold in step S350. For instance, image connectivity can be approximated by x and y run lengths at each threshold level of the difference image, $T_i$, as shown below in equation (1).

$$C(T_i) = \frac{1}{N_r}[R_x(T_i) + R_y(T_i)], 0 \leq T_i \leq T_{max} \quad \text{Equation (1)}$$

$N_r$ is the number of run-lengths, and the run-lengths are calculated according to Equations (2) and (3).

$$R_x(T_i) = \sum_{y=0}^{Y}\sum_{x=0}^{X}(x_E - x_S) \quad \text{Equation (2)}$$

$$R_y(T_i) = \sum_{y=0}^{Y}\sum_{x=0}^{X}(y_E - y_S) \quad \text{Equation (3)}$$

Variables $x_S$ and $x_E$ are the start and end of runs along rows whose indices range from 0 to X, and variables $y_S$ and $y_E$ are the start and end of runs along columns whose indices range from 0 to Y. A run is a group of adjacent pixels of the same or similar intensity values identified within the difference image. For example, a run may be a portion of a row or column or may be a region which is specified by a particular area of the difference image.

In step S350, the processor 102 obtains the decision threshold based on the local maximum average run-length determined over all possible thresholds [0,255] of the difference image.

Figure 4B:
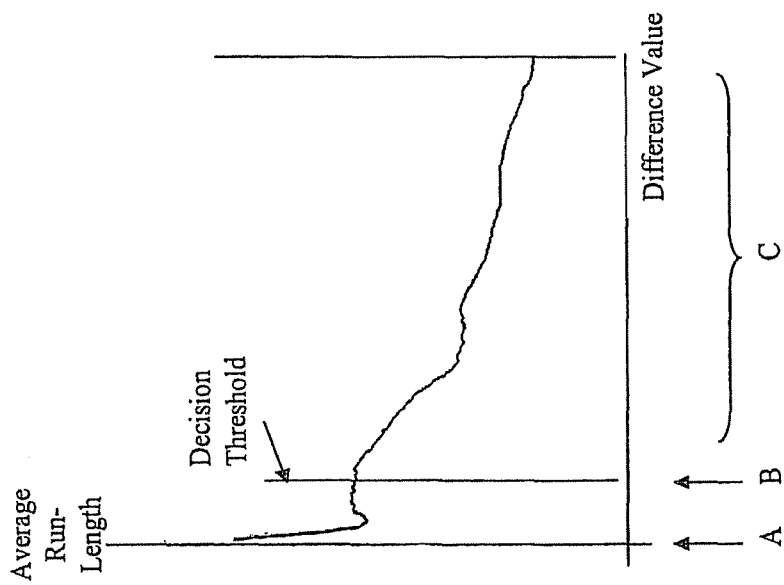
FIG. 4(b) illustrates a graph showing a decision threshold for the difference image of FIG. 4(a) according to an embodiment of the present invention.
Figure 4A:
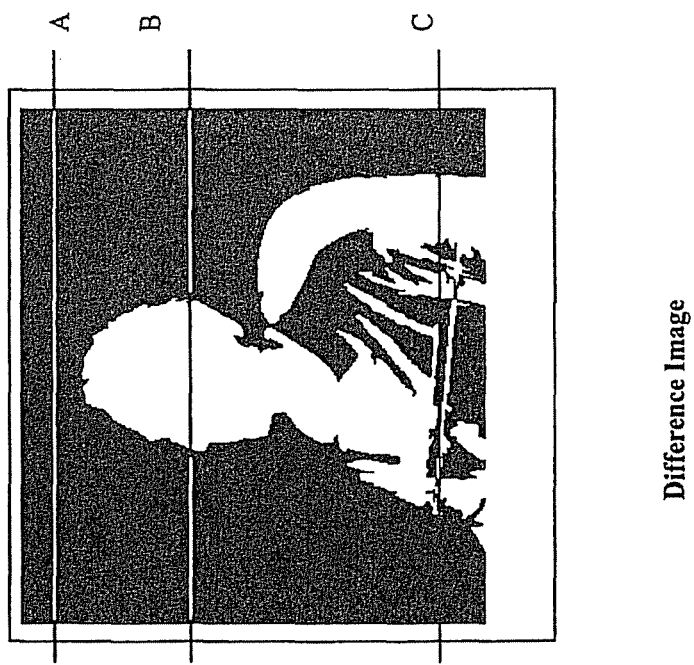
FIG. 4(a) illustrates a difference image according to an embodiment of the present invention.

FIG. 4(a) illustrates the difference image according to an embodiment of the present invention, and FIG. 4(b) illustrates a graph (connectivity plot) showing the decision threshold for the difference image of FIG. 4(a) according to an embodiment of the present invention. FIG. 4(a) shows three lines (A, B, and C), which are plotted on the graph of FIG. 4(b). Referring to FIG. 4(b), difference values for the difference image of FIG. 4(a) are illustrated on the independent axis, and the average run-lengths are illustrated on the dependent axis as a function of the difference values. Line A on FIG. 4(a) shows a horizontal run in the background region of the difference image, which has the longest average run-length on FIG. 4(b) and difference values equal to zero. This is the peak on the connectivity plot of FIG. 4(b). Line B on FIG. 4(a) shows a horizontal run through a long, non-noisy foreground region of the difference image, which has a long (but not the longest) average run-length and a local peak on the connectivity plot at B. The local peak is the decision threshold value. Line C on FIG. 4(a) shows a horizontal run that is within region C on FIG. 4(b). For instance, in region C, the connectivity plot decreases from the local peak at B as the difference values increase. This corresponds to run-lengths that become shorter and broken as the threshold difference value increases.

Next, in step S360, the processor 102 separates the background pixels from the foreground pixels based on the decision threshold level. Pixels whose values are below the decision threshold are considered background and pixels whose values are above the threshold are considered foreground.

Referring back to FIG. 2, in step S230, the processor 102 applies a privacy filter to the separated background pixels. According to an embodiment of the present invention, the privacy filter is a frosted-window filter that randomly swaps the locations of the image pixel values within the bounds of a filter mask (e.g., a pixel area). For 2example, an image pixel value associated with one location is swapped with another image pixel value associated with a different location. This "swapping" occurs for each pixel value in the pixel area, which is defined by the filter mask. Equation (3) illustrates an embodiment of the frosted-window filter.

$$I'(x,y) = F \otimes I = I(x-i, y-j), i,j \in \text{Random}\{+-W/2\}, \text{ where} \quad \text{Equation (4)}$$
$$0 < i,j,m,n < W(\text{filter size})$$

Figure 5:
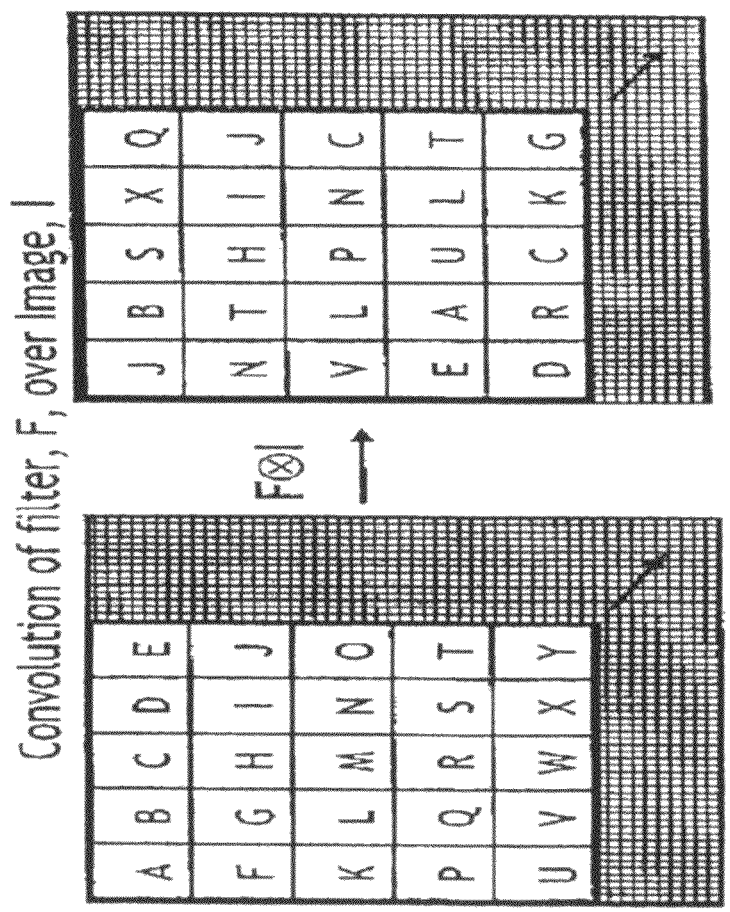
FIG. 5 illustrates a privacy filter according to an embodiment of the present invention.

The symbol, $\otimes$, refers to a convolution operation of filter F upon image I. The filter F has size W×W, and in this window, pixel values of the original image, I(x,y), are swapped randomly to occur at different locations in the resultant image, I'(x,y). FIG. 5 illustrates the frosted-window filter being applied to a pixel area of the background pixels. Image 300a is the image before the privacy filter is applied, and image 300b is the image after the privacy filter is applied. As shown in image 300b, the image pixels are randomly swapped creating a "frosted-window", which has the same average intensity and color as the original background pixels.

Referring back to FIG. 2, in step S240, the processor 102 combines the filtered background pixels with the unaltered foreground pixels to create the final video data, which is displayed on the video display 104. The above described method also applies to "foreground suppression." In that case, the privacy filter is applied to the foreground pixels, and then the filtered foreground pixels are combined with the unaltered background pixels.

Variations of the example embodiments of the present invention are not to be regarded as a departure from the spirit and scope of the example embodiments of the invention, and all such variations as would be apparent to one skilled in the art are intended to be included within the scope of this invention.

What is claimed:

1. A method of providing picture privacy in video data by a processor, the method comprising:
    separating, by the processor, pixels of a first type from pixels of a second type in a current gray-scale frame based on a decision threshold, each of the pixels of the first and second types including an image pixel value;
    applying, by the processor, a privacy filter to the pixels of the first type, the privacy filter being configured to randomly swap the image pixel values within a pixel area to occur at different locations in the pixel area;
    combining, by the processor, the filter pixels of the first type with the pixels of the second type.

2. The method of claim 1, wherein the first type is background pixels and the second type is foreground pixels.

3. The method of claim 1, wherein the first type is foreground pixels and the second type is background pixels.

4. The method of claim 1, wherein the separating step includes:
    determining a difference image based on a difference between the current gray-scale frame and an initial image;
    calculating image connectivity for the difference image; and
    obtaining the decision threshold based on the calculated image connectivity.

5. The method of claim 4, wherein the separating step further includes:
    determining a number of threshold levels for the difference image, wherein the obtaining step obtains the decision threshold based on a local maximum of an average run-length over the number of threshold levels.

6. The method of claim 4, wherein the separating step further includes:
    determining the initial image based on at least one lateral movement of a user.

7. The method of claim 1, wherein pixels having image pixel values below the decision threshold are pixels of the first type and pixels having pixel values above the decision threshold are pixels of the second type.

8. The method of claim 1, further comprising:
    determining whether to apply the privacy filter.

9. The method of claim 1, wherein an average intensity and color of an image that includes the combined pixels is same as an original image of the combined pixels.

10. A system for providing picture privacy in video, the system comprising:
    a video camera configured to capture video data;
    a processor configured to separate pixels of a first type from pixels of a second type in a current gray-scale frame of the video data based on a decision threshold, each of the pixels of the first and second types including an image pixel value,
    the processor configured to apply a privacy filter to the pixels of the first type, the privacy filter being configured to randomly swap the image pixel values within a pixel area to occur at different locations in the pixel area,
    the processor configured to combine the filter pixels of the first type with the pixels of the second type to create a resulting video image; and
    a video display configured to display the resulting video image.

11. The system of claim 10, wherein the first type is background pixels and the second type is foreground pixels.

12. The system of claim 10, wherein the first type is foreground pixels and the second type is background pixels.

13. The system of claim 10, wherein
    the processor is configured to determine a difference image based on a difference between the current gray-scale frame and an initial image,
    the processor is configured to calculate image connectivity for the difference image, and
    the processor is configured to obtain the decision threshold based on the calculated image connectivity.

14. The system of claim 13, wherein
    the processor is configured to determine a number of threshold levels for the difference image, wherein the processor obtains the decision threshold based on a local maximum of an average run-length over the number of threshold levels.

15. The system of claim 13, wherein the processor is configured to determine the initial image based on at least one lateral movement of a user.

16. The system of claim 10, wherein pixels having image pixel values below the decision threshold are pixels of the first type and pixels having pixel values above the decision threshold are pixels of the second type.

17. The system of claim 10, wherein the processor is configured to determine whether to apply the privacy filter.

18. The system of claim 10, wherein an average intensity and color of an image that includes the combined pixels is same as an original image of the combined pixels.

* * * * *